J. H. R. MACE.
WINCH FOR SHIP'S BOAT LOWERING MECHANISM AND OTHER PURPOSES.
APPLICATION FILED JAN. 26, 1920.

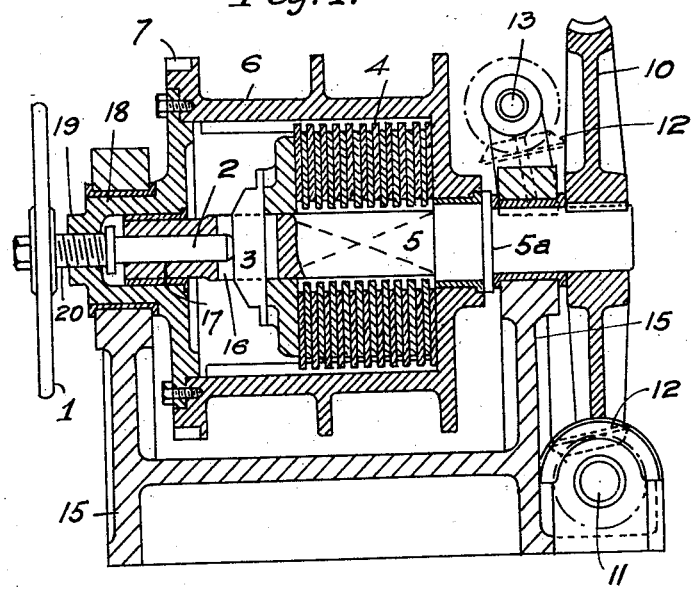
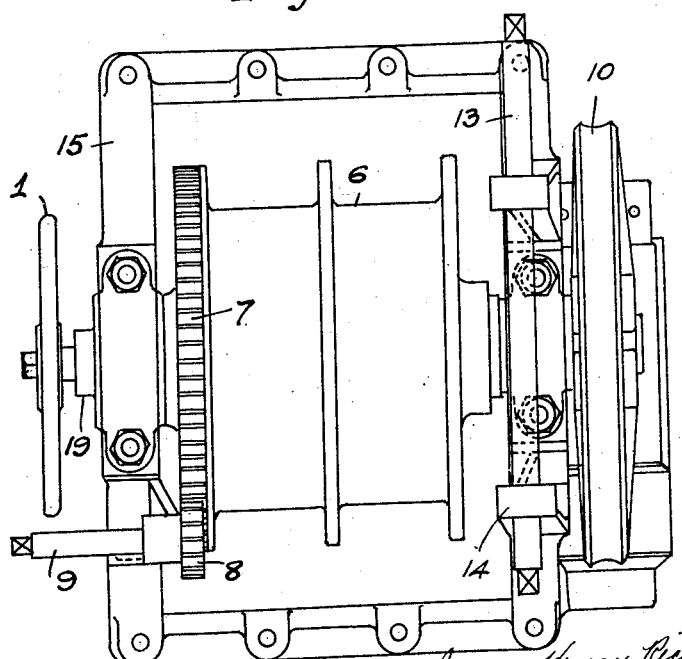

1,406,570.

Patented Feb. 14, 1922.
2 SHEETS—SHEET 2.

UNITED STATES PATENT OFFICE.

JAMES HENRY RICHARD MACE, OF LIVERPOOL, ENGLAND.

WINCH FOR SHIP'S-BOAT-LOWERING MECHANISM AND OTHER PURPOSES.

1,406,570. Specification of Letters Patent. Patented Feb. 14, 1922.

Application filed January 26, 1920. Serial No. 354,203.

*To all whom it may concern:*

Be it known that I, JAMES HENRY RICHARD MACE, a subject of the King of Great Britain, and a resident of Liverpool, England, have invented certain new and useful Improvements in Winches for Ships'-Boat-Lowering Mechanism and other Purposes, of which the following is a specification.

This invention relates to improvements in winch apparatus for raising and lowering ships' boats or other purposes.

According to this invention, the winch, which comprises, a worm gearing, the worm wheel being on the rope drum shaft which controls the raising of the falls, the rope drum being also operatable by pinion and spur gearing for the quick movement, is provided with means whereby the clutch shall automatically connect the rope drum to the rope drum shaft and therefore to the worm gearing during the lowering of the boat or the like and thus prevent the latter running away when being lowered in the falls. The winding drum is fitted with a nut or the like mechanism engaging the screwed spindle of the operating hand wheel, and in this way, when the boat or other load is being lowered the rotation of the drum under the unwinding action of the falls or rope tends to put on the brake which requires to be continually eased by the operation of the hand wheel in order to permit the boat or other load to continue its fall. In this way the apparatus becomes fool-proof and automatic in its action.

Figure 3:
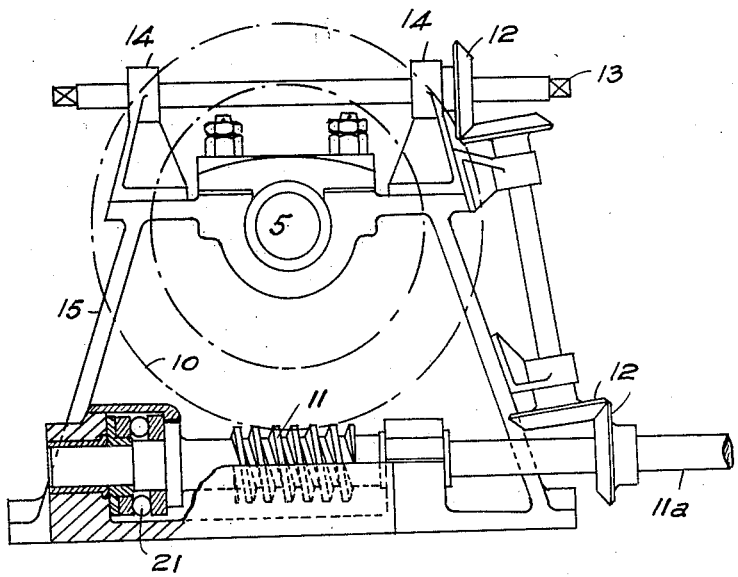
Figure 4:
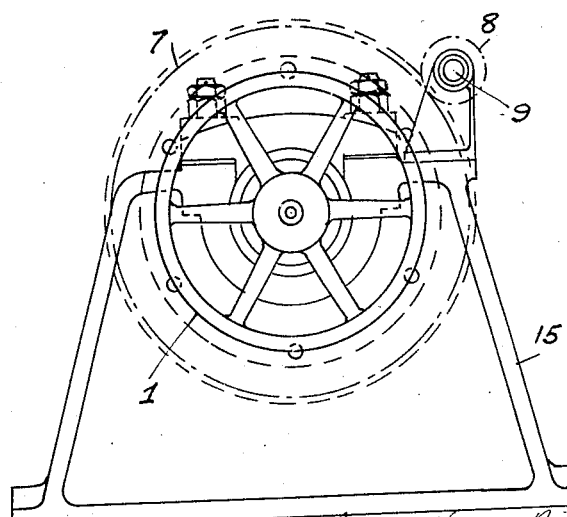

The invention is illustrated in the accompanying drawings, in which Fig. 1, is a vertical section through a winch, Fig. 2, being a plan and Fig. 3, an end view of Fig. 1, partly in section, looked at from the right, Fig. 4, being an end view of Fig. 1, looked at from the left.

In carrying out the invention, the operating hand wheel 1 is secured to a spindle 2 the end of which engages a yoke piece 3 bearing against the discs 4 of the clutch on the winding drum shaft 5. The winding drum 6 is provided with a direct gear for lifting light loads consisting of the spur wheel 7 engaged by the pinion 8 and operated from the shaft 9. Where a heavy load is to be raised, as in the case, say, in raising a ship's boat, a purchase gearing is utilized consisting of a worm wheel 10 operated by a worm shaft 11 driven by bevel gearing 12 from the transverse shaft 13 journalled in brackets 14 on the frame 15 and operated by crank handles or otherwise. The winding drum shaft 5 is loose relatively to the winding drum 6 and is adapted to be clutched rotatably thereto by the friction discs 4 which are alternately keyed to the winding drum 6 and to the winding drum shaft 5 in the well known manner. The yoke piece 3 passes through a slot 16 in the winding drum shaft 5 and the part of the winding drum shaft beyond the yoke is bored at 17 to receive the end of the wheel spindle 2. The bored extension of the winding drum shaft is journalled within a tubular extension 18 of the winding drum, which rotates in a bearing in the winch frame 15, and the outer end 19 of this tubular extension is internally threaded or fitted with a separate threaded bush to engage a screwed portion 20 on the spindle of the operating hand wheel. Supposing a boat is to be lowered, therefore, the hand wheel 1 is unscrewed in its nut 19 on the tubular extension, thus releasing the discs 4 of the clutch and permitting the boat to fall by the unwinding of the drum 6. As the operator maintains his grip of the hand-wheel, the unwinding rotary action of the drum acts to screw the nut 19 on the screwed spindle 20 which being held against rotation is caused to travel axially inward and again compresses the discs 4 and brakes the fall of the boat. The operator again unscrewing the hand wheel to free the brake, the same automatic braking action again takes place and so on throughout the lowering of the boat. In this way, a complete automatic control of the lowering is effected, the operator requiring continually to ease the brake in order to permit the boat to be lowered in the falls.

A ball race 21 is fitted to take the end thrust of the worm spindle 11 and, if desired, magnifying levers may be fitted within the drum 6 to increase the thrust against the discs 4 from the spindle 2. These discs 4 of the clutch may be of the flat type shown, or they may be discs of the Hele-Shaw clutch type having an annular V-section groove.

By arranging that the screwed spindle 20 engages a nut element 19 which is integral with the drum casing 6 containing the clutch discs 4, when the discs are compressed to couple the shaft 5 to the drum 6 no end thrust is set up on the collar 5ª, which is of considerable advantage.

Though the mechanism has been described as capable of being hand operated it is mainly also available for being motor driven, the motor driving the shaft 11ª so that the worm gear 11 may be driven by power as well as alternatively by the hand shaft 13, the latter being then available in case of accident to the motor drive.

Where the gear is motor driven from the shaft 11ª, winding and lowering of a load may take place while the motor drives continuously in a constant direction, the clutch being put in when the load requires to be raised and allowed to slip when lowering, the shaft 5 being continuously driven. Similarly by graduating the pressure of the hand wheel 5 the clutch may be given a slipping action and the load raised at a lower relative speed than if the clutch were tightly locked. During the unwinding rotational movement of the drum 6 and when compression is put on the discs 4 to arrest or brake the lowering of the load, the shaft 5 with its discs is held against backward rotation by the worm and wheel connection 10, 11.

Though the winch has been described particularly for use with a ship's boat launching mechanism, it may be applied to other purposes, for instance, for ash hoists and cargo winches on board ship or otherwise, or for use generally for hoists and the like.

I claim—

1. In a winch, in combination, a shaft, means for holding the shaft against backward rotation, a winding drum loose on said shaft, a friction clutch for rotatively coupling the drum to the shaft, and means actuated by the unwinding of the drum to engage the clutch and retard the unwinding action.

2. In a winch, in combination, a shaft, means for holding the shaft against backward rotation, a winding drum loose on said shaft, a friction disc clutch for rotatively coupling the drum to the shaft, means actuated by the unwinding of the drum to engage the clutch and retard the unwinding action, and means for releasing the clutch.

3. In a winch, in combination, a shaft, means for holding the shaft against backward rotation, a winding drum loose on said shaft, an internally threaded part on the drum, a friction disc clutch for rotatively coupling the drum to the shaft, a screwed spindle engaging the internally threaded part of the drum, the unwinding rotation of the drum causing the spindle when held to compress the discs and retard the unwinding action.

4. In a winch, in combination, a shaft, means for holding the shaft against backward rotation, a winding drum loose on said shaft, a tubular extension on the drum forming a bearing for the shaft, an internally threaded part on the drum, a friction disc clutch for rotatively coupling the drum to the shaft, a screwed spindle engaging the internally threaded part of the drum and passing axially down the shaft, a yoke passing across the shaft engaged by the spindle, the unwinding rotation of the drum causing the spindle when held to compress the discs and retard the unwinding action.

5. In a winch, in combination, a shaft, a worm and worm wheel gearing for driving the shaft, a winding drum loose on said shaft, a friction disc clutch for rotatively coupling the drum to the shaft, means actuated by the unwinding of the drum to engage the clutch and retard the unwinding action, and means for releasing the clutch.

In testimony whereof I affix my signature in presence of two witnesses.

JAMES HENRY RICHARD MACF

Witnesses:
ESTHER HEGINBOTHAM,
A. J. DAVIS.